United States Patent
Venkatachalam et al.

(10) Patent No.: US 7,652,614 B2
(45) Date of Patent: Jan. 26, 2010

(54) GROUND CLUTTER MITIGATION USING A PARAMETRIC TIME DOMAIN METHOD

(75) Inventors: Chandrasekaran Venkatachalam, Fort Collins, CO (US); Dmitriy Moiseev, Fort Collins, CO (US); Cuong Nguyen, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 28 days.

(21) Appl. No.: 11/830,574

(22) Filed: Jul. 30, 2007

(65) Prior Publication Data
US 2009/0033542 A1 Feb. 5, 2009

(51) Int. Cl.
*G01S 13/95* (2006.01)

(52) U.S. Cl. .................. 342/26 R; 342/25 D; 342/159

(58) Field of Classification Search .............. 342/159, 342/26 R–26 D
See application file for complete search history.

(56) References Cited

U.S. PATENT DOCUMENTS

| | | | |
|---|---|---|---|
| 7,053,813 B1 | 5/2006 | Hubbert et al. | |
| 2005/0093734 A1 | 5/2005 | Alford et al. | |
| 2007/0152867 A1 | 7/2007 | Randall | |
| 2007/0273576 A1 | 11/2007 | Struckman et al. | |

OTHER PUBLICATIONS

Precipitation Spectral Moments Estimation and Clutter Mitigation using Parametric Time Domain Model Nguyen, C.M.; Moiseev, D.N.; Chandrasekar, V.; Geoscience and Remote Sensing Symposium, 2006. IGARSS 2006. IEEE International Conference on Jul. 31, 2006-Aug. 4, 2006 pp. 652-655.*
A time domain clutter filter for staggered PRT and dual- PRF measurements Nguyen, C.M.; Moiseev, D.N.; Chandrasekar, V.; Geoscience and Remote Sensing Symposium, 2007. IGARSS 2007. IEEE International Jul. 23-28, 2007 pp. 3325-3328.*
A parametric time domain method for spectral moment estimation and clutter mitigation for weather radars Nguyen, C.M., Moiseev, D.N., Chandrasekar, V. Journal of Atmospheric and Oceanic Technology, {J-Atmos-Ocean-Technol-USA}, Jan. 2008, vol. 25, No. 1, p. 83-92, 13 refs, CODEN: JAOTES, ISSN: 0739-0572.*
Parametric spectral moments estimation for wind profiling radar Boyer, E.; Larzabal, P.; Adnet, C.; Petitdidier, M.; Geoscience and Remote Sensing, IEEE Transactions on vol. 41, Issue 8, Aug. 2003 pp. 1859-1868.*

* cited by examiner

*Primary Examiner*—Thomas H Tarcza
*Assistant Examiner*—Cassi Galt
(74) *Attorney, Agent, or Firm*—Townsend and Townsend and Crew LLP

(57) ABSTRACT

Methods and systems are disclosed for investigating a region of interest with a radar. A radar signal is propagated to the region of interest. Sampled time-domain radar data scattered within the region of interest are collected. A likelihood function is calculated with the sampled time-domain data within a parametric model of the region of interest for a defined set of parameters. The set of parameters in varied to find an extremum of the likelihood function.

16 Claims, 15 Drawing Sheets

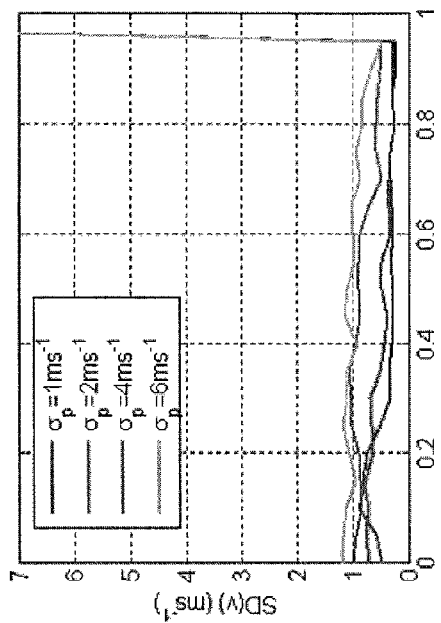
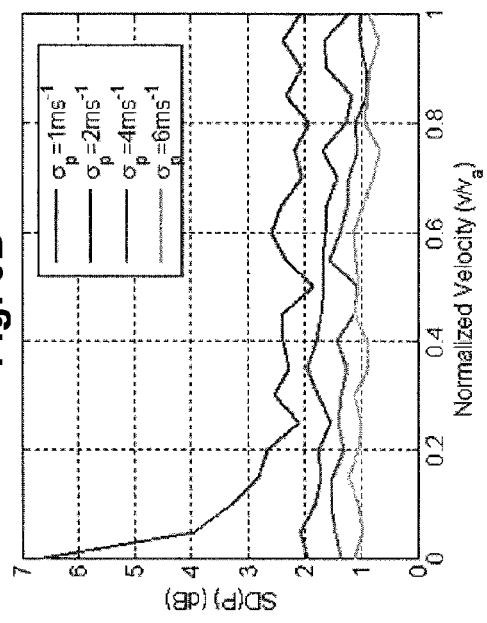
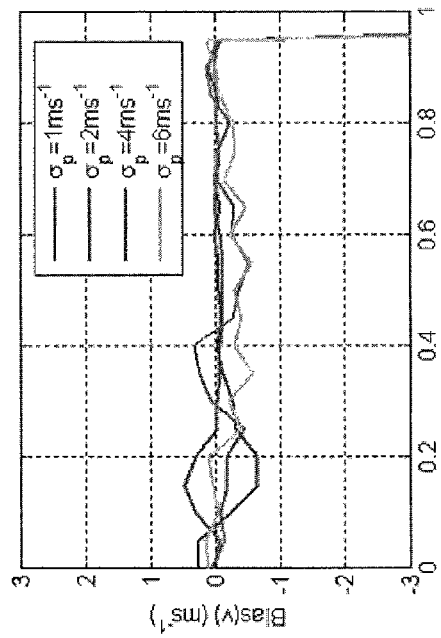
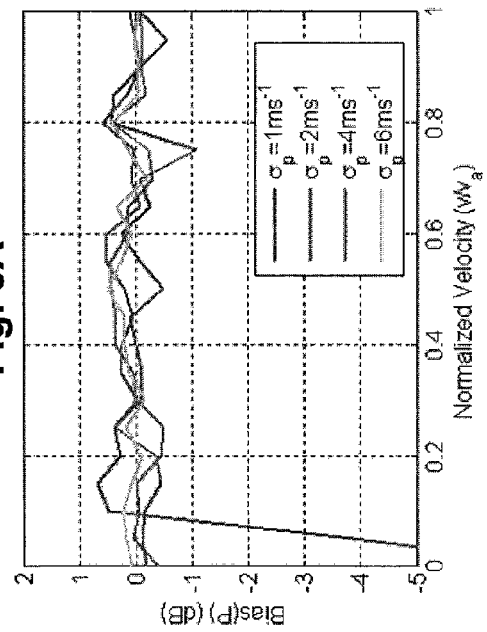
Fig. 5A
Fig. 5B
Fig. 5C
Fig. 5D

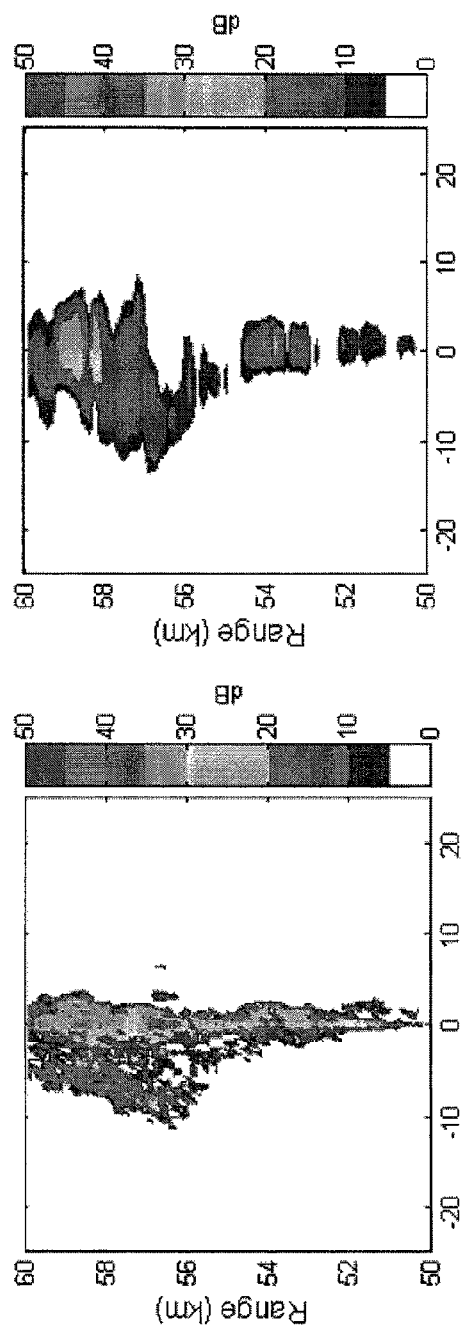
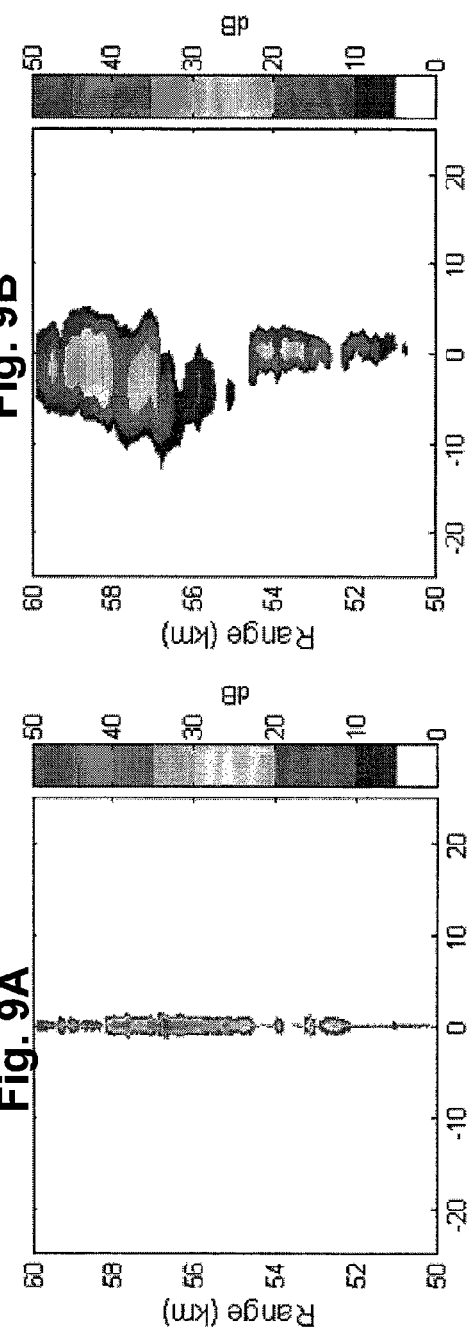
Fig. 9A  Fig. 9B  Fig. 9C  Fig. 9D

GROUND CLUTTER MITIGATION USING A PARAMETRIC TIME DOMAIN METHOD

STATEMENT AS TO RIGHTS TO INVENTIONS MADE UNDER FEDERALLY SPONSORED RESEARCH AND DEVELOPMENT

This invention was made with Government support through Engineering Research Centers program under NSF Cooperation Programs No. ERC0313747.

BACKGROUND OF THE INVENTION

This application relates generally to radar. More specifically, this application relates to mitigation of ground clutter contributions to radar using parametric time-domain techniques.

One of the fundamental objectives of meteorological radar systems is to sample the atmosphere surrounding the Earth to provide a quantitative measure of precipitation. Conventional meteorological radars provide coverage over long ranges, often on the order of hundreds of kilometers. A general schematic of how such conventional radar systems function is provided in FIG. 1. In this illustration, a radar is disposed at the peak of a raised geographical feature such as a hill or mountain 104. The radar generates an electromagnetic beam 108 that disperses approximately linearly with distance, with the drawing showing how the width of the beam 108 thus increases with distance from the radar. Various examples of weather patterns 116 that might exist and which the system 100 attempts to sample are shown in different positions above the surface 112 of the Earth.

For weather radars, the signal coming from ground targets represents clutter. It is generally desirable to mitigate the contribution of clutter to the overall radar signal to improve the quality of the radar signal and for quantitative applications. Such mitigation is conventionally achieved by applying a notch filter around zero Doppler frequency. The main disadvantage of such an approach is the signal loss, especially in cases where weather echoes have small radial velocities. Recent developments in radar signal processors allow for improvement in clutter suppression. For example, one approach compensates for the effect of notching by using advanced spectral filter that interpolates over notched spectral lines. The limitation of spectral filtering techniques is the effect of spectral leakage, caused by finite sample length, on the spectral moments estimates. As a result, spectral processing limits successful clutter suppression to cases of moderate clutter-to-signal ratios.

A general need in the art accordingly persists for improvement in mitigating the effect of ground clutter.

BRIEF SUMMARY OF THE INVENTION

Embodiments of the invention make use of a parametric time-domain method ("PTDM") for mitigating ground clutter in radar observations. Such embodiments accordingly provide a method of investigating a region of interest with a radar. A radar signal is propagated to the region of interest. Sampled time-domain radar data scattered within the region of interest are collected. A likelihood function is calculated with the sampled time-domain data within a parametric model of the region of interest for a defined set of parameters. The set of parameters in varied to find an extremum of the likelihood function.

In some embodiments, the extremum is a global extremum while in other embodiments, the extremum is a local extremum. The extremum may be a minimum.

In a specific embodiment, the likelihood function is $L(\theta) = \ln(|R(\theta)|) + \mathrm{tr}(R^{-1}(\theta)\hat{R}_v)$, where R is a covariance matrix having elements $$R[k,l] = P_p \exp\left[-\frac{8\pi^2 \sigma_p^2 (k-l)^2 T_s^2}{\lambda^2}\right] \exp\left[-j\frac{4\pi \bar{v}(k-l) T_s}{\lambda}\right] + + P_c \exp\left[-\frac{8\pi^2 \sigma_c^2 (k-l)^2 T_s^2}{\lambda^2}\right] + \frac{2T_s}{\lambda} \sigma_N^2 \delta(k-l),$$

for $k, l = 1, \ldots, N$. $T_s$ is a measured signal sample; $\lambda$ is a wavelength of the radar signal; j is $\sqrt{-1}$; and $\delta$ is a Kronecker function. The set of parameters comprises $P_p$ as a precipitation signal power, $\sigma_p$ as a precipitation spectrum width, $\bar{v}$ as a mean velocity of precipitation, $P_c$ as a clutter power, $\sigma_c$ as a clutter spectrum width, and $\sigma_N^2$ as a noise power.

In certain instances, the collected sampled time-domain radar data comprises collected time-domain radar data distributed nonuniformly in time. For example, in one specific embodiment, time spacings between subsequent collected time-domain radar data are substantially in a ratio of 2:3. In another specific embodiment, time spacings between subsequent collected time-domain radar data are substantially in a ratio of 3:4.

Methods of investigating a region of interest may be embodied in a radar system that comprises a radar source, a radar detector, and a computational unit. The radar source is configured to propagate a radar signal and the radar detector is configured to collect radar data. The computational system is in communication with the radar source and with the radar detector. The computational system comprises a processor and a memory coupled with the processor. The memory comprises a computer-readable storage medium having a computer-readable program embodied therein. The computer-readable program has instructions for directing operation of the radar system to investigate the region of interest in accordance with the methods described above.

BRIEF DESCRIPTION OF THE DRAWINGS

A further understanding of the nature and advantages of the present invention may be realized by reference to the remaining portions of the specification and the drawings wherein like reference labels are used throughout the several drawings to refer to similar components. In some instances, reference labels include a numerical portion followed by a latin-letter suffix; reference to only the numerical portion of reference labels is intended to refer collectively to all reference labels that have that numerical portion but different latin-letter suffices.

FIGS. 5A-5D provide simulated spectra that compare clutter mitigation using ADVANCED SPECTRAL FILTER and PTDM for a second measurement scenario;

FIGS. 9A-9D provide observed and estimate spectrographs of a light precipitation measured by a particular radar;

DETAILED DESCRIPTION OF THE INVENTION

Embodiments of the invention make use of a parametric time-domain method to mitigate radar ground clutter. For low elevation angles, precipitation Doppler power spectra can be considered to follow Gaussian functional form. This permits the construction of parametric spectral moment estimators, and since the variance of maximum likelihood estimators asymptotically approaches the Cramar-Rao lower bound, such an approach may provide more accurate estimates. Numerous radar observations show that ground-clutter spectra may be closely approximated to follow a Gaussian functional form with a mean frequency of zero and spectral width ranging between 0.1 and 0.4 m/s.

Figure 1:
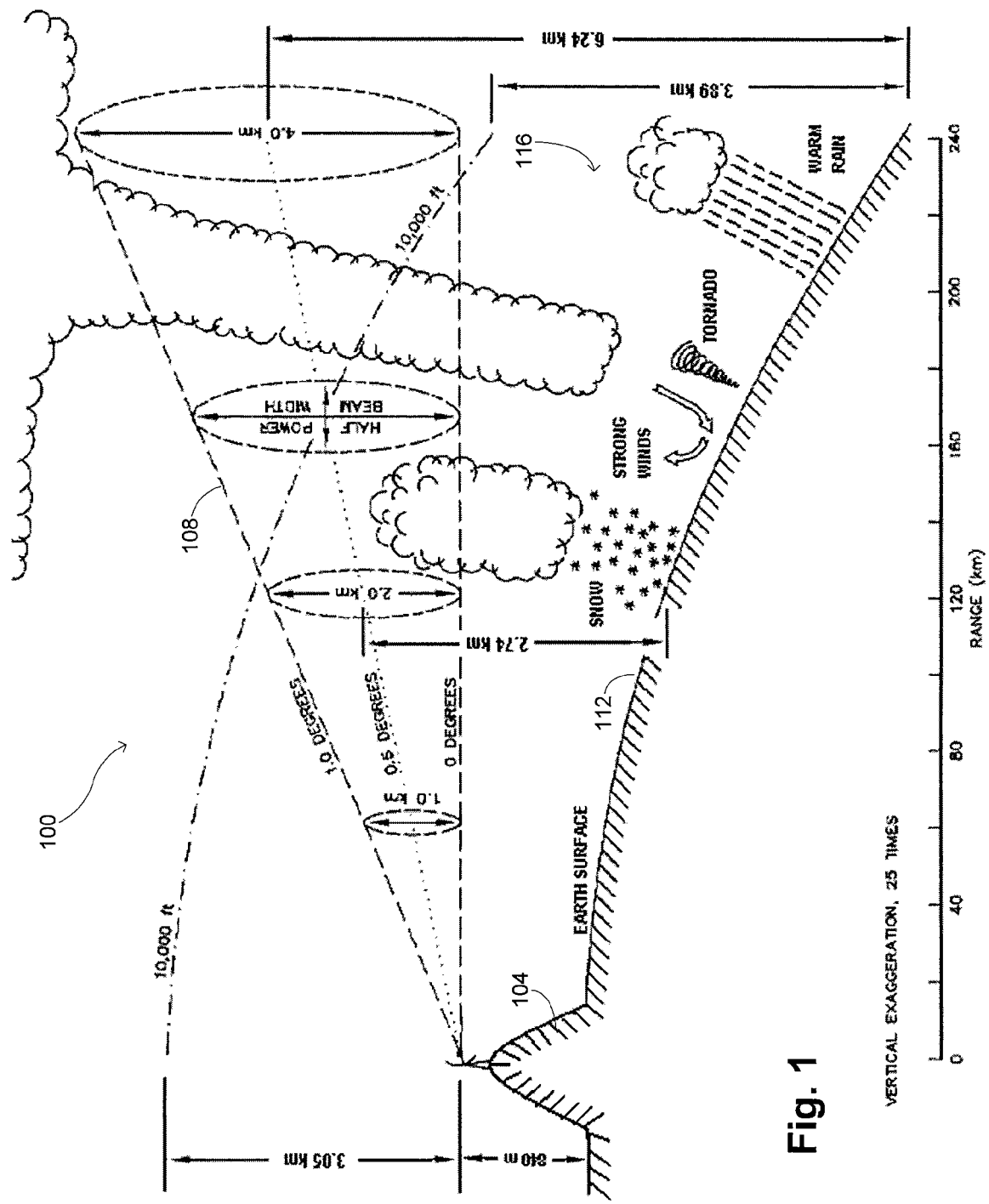
FIG. 1 provides a schematic illustration of the operation of a conventional radar system (reproduced from the National Academy of Sciences Report, "Flash flood forecasting over complex terrain")
Figure 2A:
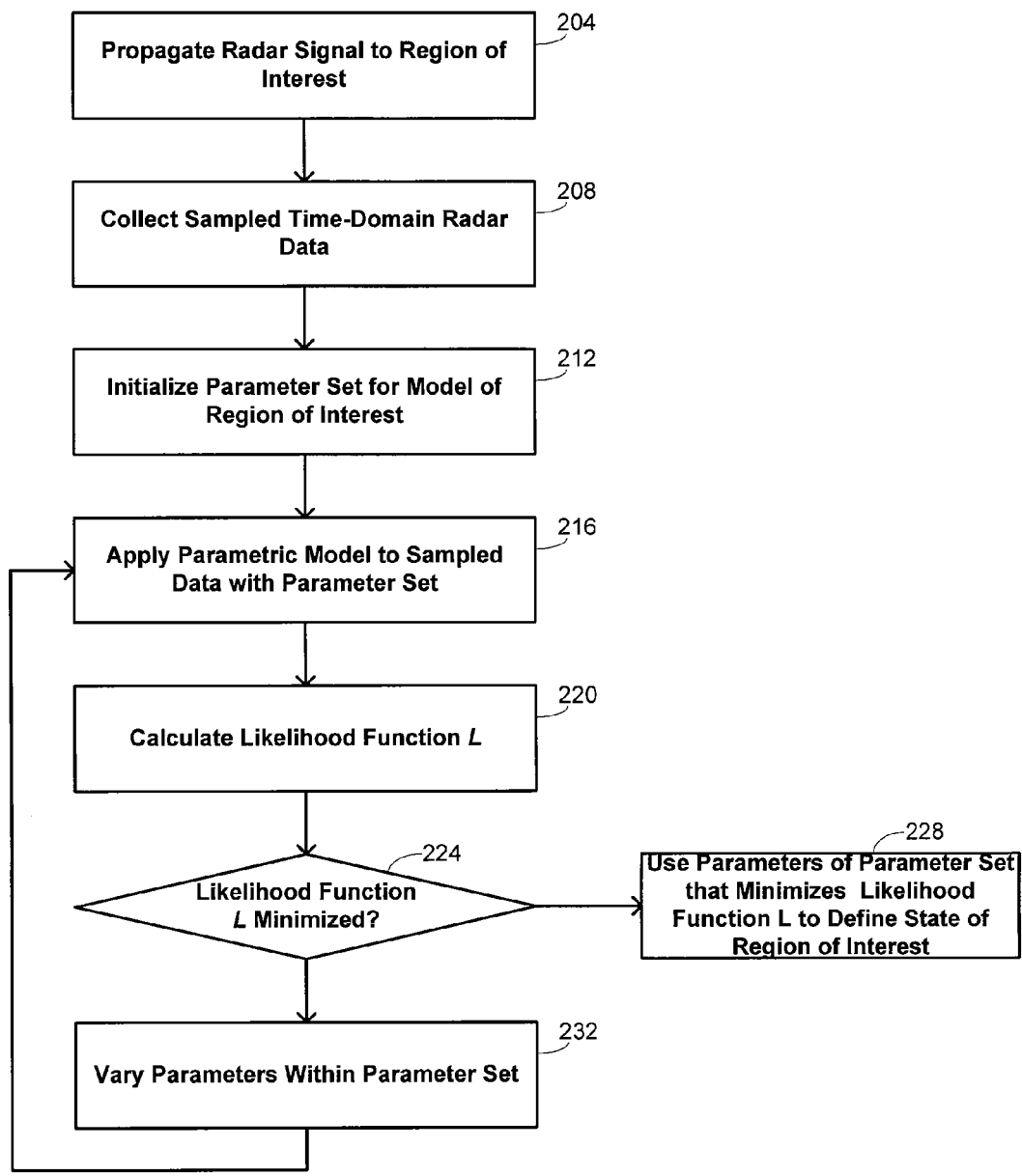
FIG. 2A is a flow diagram summarizing parametric time-domain methods for mitigating ground clutter in embodiments of the invention.

A general overview of methods of the invention is provided with the flow diagram of FIG. 2A. The methods may begin by propagating a radar signal to a region of interest as indicated at block 204. Sampled time-domain data are collected at block 208 and used in determining parameters for a time-domain parametric model of the region of interest. A specific model is described below but alternative embodiments of the invention may use other parametric models.

At block 212, the model is initialized with an initial parameter set, with subsequent steps in the methods varying the parameter set to determine parameters within the model that accurately describe the region of interest. Thus, at block 216, the parametric model is applied to sampled data with the initial parameter set. The sampled data may be uniformly sampled or nonuniformly sampled in different embodiments. Application of the parametric model is used to calculate a likelihood function L that serves as a measure of how good the parameter set is in defining the region of interest. The likelihood function L may be constructed so that the best fit is achieved at a local extremum of the likelihood function in parameter space. The example of FIG. 2A illustrates an embodiment in which a local minimum of the likelihood function L is sought but this is not intended to be limiting; there are alternative embodiments in which a local maximum of the likelihood function L defines the best fit.

The likelihood function is accordingly calculated within the model at block 220 and a check made at block 224 whether a local extremum has been found. If not, the parameters within the model are varied at block 232 and the procedure repeated. That is, the parametric model is applied with the new parameter set at block 216 to allow calculation of a new likelihood function L at block 220 and a new test at block 224 whether a local extremum has been found. There are a number of ways in which the parameter variation at block 232 may be carried out and these are known to those of skill in the art. For instance, in some embodiments, the value of only a single parameter at each encounter with block 232 so that a local extremum is found in one dimension of the multidimensional parameter space; this is followed by variation of another parameter to find a local extremum in another dimension, and repeated until a local minimum in all dimensions of the parameter space is found. In other embodiments, multiple parameters may be varied at block 232. Different methods of varying the model parameters may be used in different embodiments, with the rate of convergence to a local extremum being at least partly dependent on the specific physical characteristics of the region of interest.

Figure 2B:
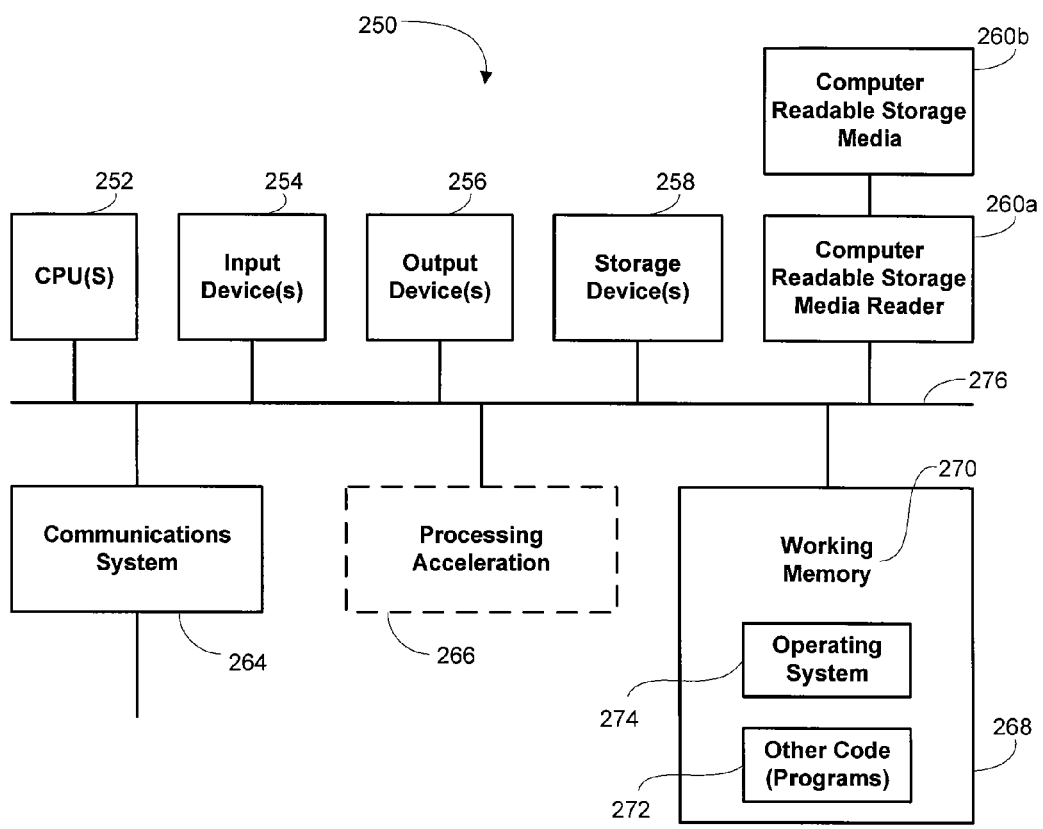
FIG. 2B is a schematic illustration of a computational system on which methods of the invention may be embodied.

The determination of a local extremum of the likelihood function L described in connection with FIG. 2A may be implemented with a computational device such as shown schematically in FIG. 2B, which broadly illustrates how individual system elements may be implemented in a separated or more integrated manner. The device 250 is shown comprised of hardware elements that are electrically coupled via bus 276. The hardware elements include a processor 252, an input device 254, an output device 256, a storage device 258, a computer-readable storage media reader 260a, a communications system 264, a processing acceleration unit 266 such as a DSP or special-purpose processor, and a memory 268. The computer-readable storage media reader 260a is further connected to a computer-readable storage medium 260b, the combination comprehensively representing remote, local, fixed, and/or removable storage devices plus storage media for temporarily and/or more permanently containing computer-readable information. The communications system 264 may comprise a wired, wireless, modem, and/or other type of interfacing connection and permits data to be collected from the radars. In some instances, such data collection is performed in real time by the communications system in evaluating the intrinsic parameters of the environment.

The computational device 250 also comprises software elements, shown as being currently located within working memory 270, including an operating system 274 and other code 272, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

There are a number of considerations that may be relevant in construction of an appropriate likelihood function L. The description below provides a detailed comparison of the performance of the PTDM as implemented in accordance with FIG. 2A with the ADVANCED SPECTRAL FILTER. This detailed description is intended to be illustrative and not limiting, providing an example of the accuracy that may be achieved with the PTDM, particularly relative to the accuracy achievable with the ADVANCED SPECTRAL FILTER. In alternative embodiments, other forms of the likelihood function may be used with departing from the spirit and scope of the invention.

Since PTDM is based on estimation of signal properties in the time domain, the results are not substantially affected by spectral leakage. This permits accurate estimation of spectral moments even for strong clutter cases. Simultaneous estimation of clutter and signal properties permits accurate retrieval of precipitation spectral moments even in cases of strong overlap of precipitation and clutter spectra.

The range velocity ambiguity is a fundamental limitation of radar observations. In cases of uniform pulsing, the maximum range $r_a$ is related to the maximum unambiguous velocity $v_a$ as $v_a r_a = c\lambda/8$, where c is the speed of light and $\lambda$ is the radar wavelength. An increase in the pulse repetition time ("PRT") thus results in an increase of maximum unambiguous range but causes a decrease in maximum unambiguous velocity. Uniform sampling of radar signals therefore always implies a tradeoff between unambiguous Doppler velocity and maximum range.

This may be accommodated by choosing a staggered PRT pulsing scheme that alternates between two different pulse intervals, $T_1$ and $T_2$. If pulse pair processing is used with such staggered PRT pulsing, the unambiguous Doppler velocity may be determined by the pulse repetition time difference. In certain cases, the maximum range may be related to the sum of the pulse repetition times.

Embodiments of the invention apply the PTDM directly to staggered PRT sequences. Such an approach allows both clutter filtering and spectral-moment estimation to be based on a parametric time-domain model and is therefore easily extended to the case of nonuniformly sampled radar signals such as staggered PRT observations.

Radar signals may be represented as the sum of individual signals coming from scatterers in the radar resolution volume. Since the individual signals have similar statistical properties, the joint probability density function of real and imaginary parts of the received signal can be considered to be zero mean normal. The multivariate probability density function of the complex voltage may be written as $$f(V) = \frac{1}{\pi^N |R|} \exp[-V^H R^{-1} V]$$
$$= \frac{1}{\pi^N |R|} \exp[-tr(R^{-1} \hat{R}_V)],$$

where V is the vector of the received signal samples, $R = E[VV^H]$ is the covariance matrix and $R_v = VV^H$ is the sample covariance matrix. In these expression, the superscript H is used to denote the transpose conjugate.

Under conditions in which the Doppler spectra of clutter and precipitation are well represented with a Gaussian shape, the Doppler spectrum may be written as $$S(v) = \frac{P_p}{\sigma_c \sqrt{2\pi}} \exp\left[-\frac{(v-\bar{v})^2}{2\sigma_p^2}\right] + \frac{P_c}{\sigma_c \sqrt{2\pi}} \exp\left[-\frac{v^2}{2\sigma_c^2}\right] + \frac{2T_s}{\lambda} \sigma_N^2,$$

where $P_p$ is the precipitation signal power, $\sigma_p$ is the precipitation spectrum width, $\bar{v}$ is the mean velocity of precipitation, $P_c$ is the clutter power, $\sigma_c$ is the clutter spectrum width, and $\sigma_N^2$ is the noise power. Given this spectral representation, the covariance matrix of the measured signal sampled $T_s$ apart may be written as $$R[k, l] = P_p \exp\left[-\frac{8\pi^2 \sigma_p^2 (k-l)^2 T_s^2}{\lambda^2}\right] \exp\left[-j\frac{4\pi \bar{v}(k-l)T_s}{\lambda}\right] ++$$
$$P_c \exp\left[-\frac{8\pi^2 \sigma_c^2 (k-l)^2 T_s^2}{\lambda^2}\right] + \frac{2T_s}{\lambda} \sigma_N^2 \delta(k-l)$$

for k, l=1, ..., N and where $\lambda$ denotes the radar wavelength.

Given the parametric representation of the covariance matrix and the probability density function, the log-likelihood function L may be written for this embodiment as $$L(\theta) = \ln(|R(\theta)|) + tr(R^{-1}(\theta) \hat{R}_v),$$

where $\theta = (\sigma_c, P_c, \bar{v}, \sigma_p, P_p, \sigma_N^2)$ is the vector of unknown parameters, | | denotes the determinant operator, and tr( ) denotes the trace operator. As explained above, the spectral moments of precipitation signal and clutter may then be obtained by solving the minimization problem In embodiments where a staggered PRT observation scheme is used, the pulse repetition time alternates between two pulse spacings $T_1$ and $T_2$. In the case of a pulse pair processing scheme, the Doppler velocity is $$v = \frac{\lambda}{4\pi} \frac{\arg(R(T_1) R^*(T_2))}{T_2 - T_1},$$

where R(T) is the autocorrelation function of the observed signal. In this case, the maximum unambiguous velocity $v_a$ is defined as $$v_a = \frac{\lambda}{4(T_2 - T_1)},$$

with $T_1 < T_2$.

Generally the $T_1$ and $T_2$ are selected as multiples of a certain time unit $T_u$. In one specific embodiment, $T_1/T_2$ is approximately ⅔ and in another specific embodiment, $T_1/T_2$ is approximately ¾, but the invention is not limited to these values of the pulse-spacing ratios. embodiments of the invention that use PTDM can advantageously be applied directly to a nonuniformly sampled sequence and produce results that are comparable to application of the method to uniformly sampled signals. In the case of staggered PRT observations, the sample covariance in a particular embodiment is given as $$\hat{R}_v = \begin{bmatrix} R(0) & R(T_1) & R(T_1+T_2) & R(2T_1+T_2) & \cdots & R\left(\frac{N}{2}(T_1+T_2)\right) \\ R(-T_1) & R(0) & R(T_1) & R(T_1+T_2) & \cdots & R\left(\frac{N}{2}(T_1+T_2)-T_2\right) \\ R(-T_1-T_2) & R(-T_1) & R(0) & R(T_1) & \cdots & R\left(\frac{N-2}{2}(T_1+T_2)\right) \\ R(-2T_1-T_2) & R(-T_1-T_2) & R(-T_1) & R(0) & \cdots & R\left(\frac{N-2}{2}(T_1+T_2)-T_2\right) \\ \vdots & \vdots & \vdots & \vdots & \ddots & \vdots \\ R\left(-\frac{N}{2}(T_1+T_2)\right) & R\left(-\frac{N}{2}(T_1+T_2)+T_2\right) & R\left(-\frac{N-2}{2}(T_1+T_2)\right) & R\left(-\frac{N-2}{2}(T_1+T_2)+T_2\right) & \cdots & R(0) \end{bmatrix}.$$

The PTDM can accordingly be applied directly to a staggered PRT sequence.

The inventors have carried out a number of studies to evaluate the reliability of the methods of the invention, including radar-signal simulations error analyses. To demonstrate performance of the method, time-series data were collected with staggered PRT and with uniform pulsing PRT schemes with a particular radar. The PTDM was applied to the staggered PRT observations and ADVANCED SPECTRAL FILTER was applied to the data with the uniform PRT. As discussed in detail below, the results are comparable and in cases of strong clutter contamination, PTDM gives about 10 dB more in clutter suppression.

Thus, in a first set of studies, the performance of PTDM and ADVANCED SPECTRAL FILTER were evaluated on time-series data. To include the window effect to simulated time-series data, the signal was simulated for 40 times the length of the desired time-series length. The simulation was carried out for a number of input parameters. The values of these parameters are provided in the table below.

TABLE I

| Simulation Parameters | |
|---|---|
| Parameter | Values |
| CSR (dB) | 50, 60 |
| SNR (dB) | 10, 20 |
| $\sigma_c$ (m/s) | 0.28 |
| $\sigma_p$ (m/s) | 1, 2, 4, 6 |
| $\bar{v}$ (m/s) | 0.00, $0.05v_{max}$, $0.10v_{max}$, ... $1.00v_{max}$ |
| $\sigma_N^2$ (dB) | $[\sigma_N^{syst}]^2 = 15$ |
| N (samples) | 32, 64 |
| $T_u$ (ms) | 1 |
| $\lambda$ (m) | 0.1 |

Since the simulated scenarios have relatively large CSR values, the ADVANCED SPECTRAL FILTER processing was applied to Doppler spectra obtained using DFT with time-series data weighted by a Blackman window.

Figure 3A:
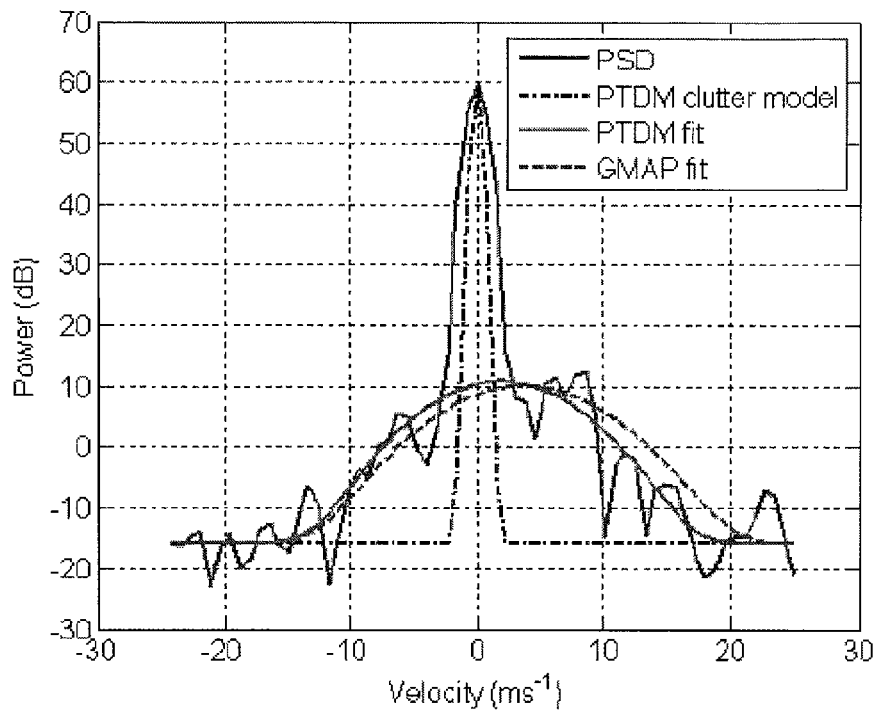
FIGS. 3A and 3B provide simulated spectra for evaluating the performance of spectral-moment estimation techniques using ADVANCED SPECTRAL FILTER and PTDM.
Figure 3B:
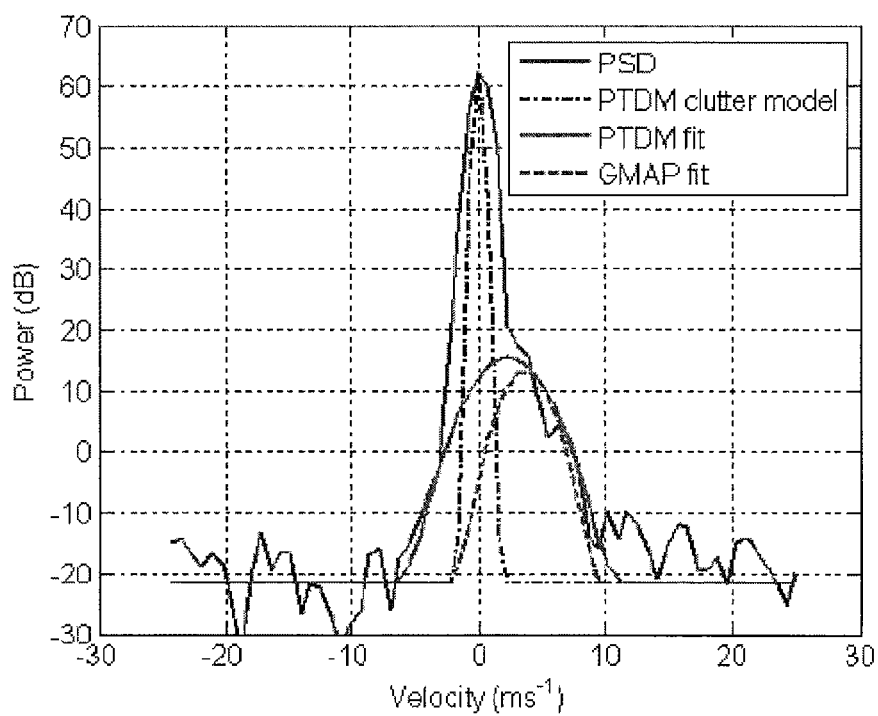
Figure 4A:
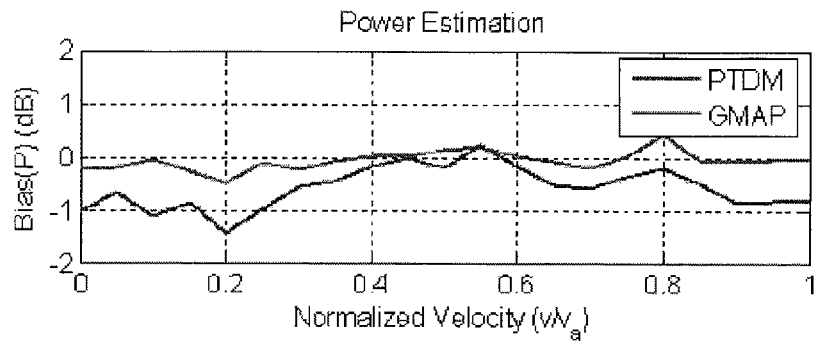
FIGS. 4A-4D provide simulated spectra that compare clutter mitigation using ADVANCED SPECTRAL FILTER and PTDM for a first measurement scenario.
Figure 4B:
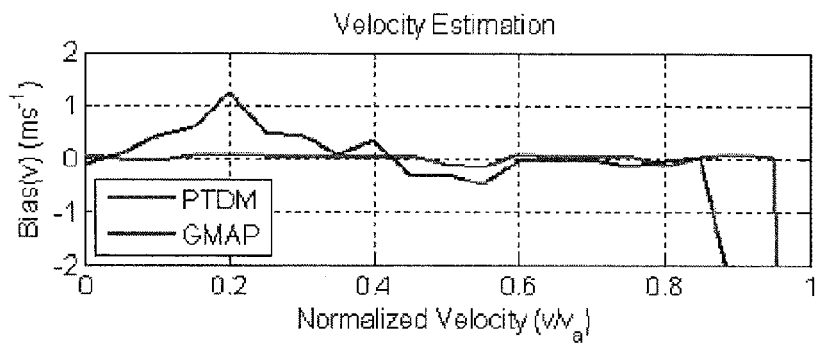
Figure 4C:
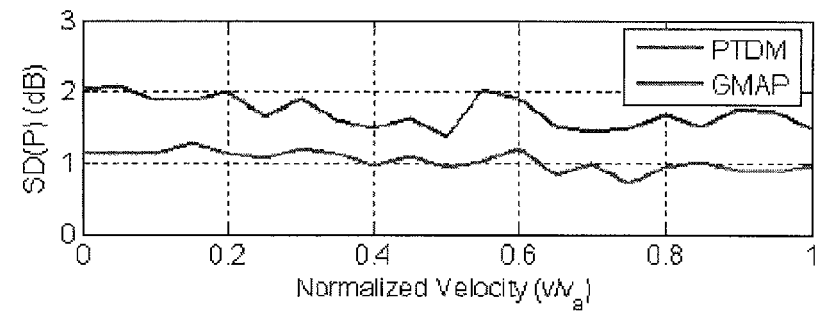
Figure 4D:
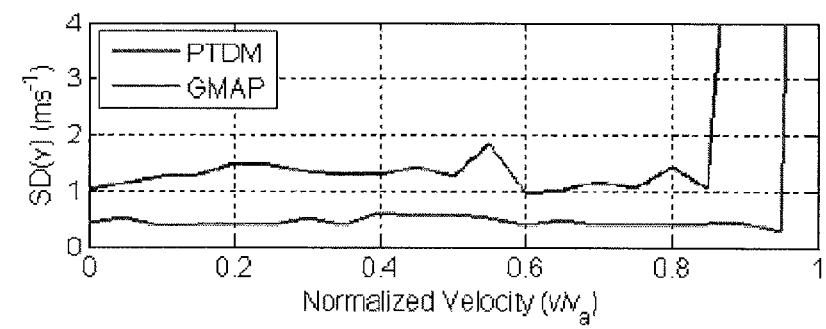

To evaluate the performance of the spectral moment estimation techniques, both ADVANCED SPECTRAL FILTER and PTDM were applied to the simulated time-series data. An example of the resulting spectrographs is shown in FIGS. 3A and 3B. These results correspond to simulated spectra obtained when CSR=40 dB, SNR=20 dB, and with a Blackman window. FIG. 3A shows a simulated power spectrum where the spectrum width is 4 m/s. The curve labeled "ADVANCED SPECTRAL FILTER fit" shows the ADVANCED SPECTRAL FILTER estimated precipitation spectrum and the curve labeled "PTDM fit" shows the PTDM retrieval. FIG. 3B is similar but shows results when the precipitation spectrum width is 2 m/s.

One can readily observe from FIGS. 3A and 3B that for the case of small precipitation spectral width and small radial velocity, the PTDM performs better than the ADVANCED SPECTRAL FILTER. This can be understood as resulting from the effect of notching and the window on the ADVANCED SPECTRAL FILTER estimate.

A more complete evaluation of the ADVANCED SPECTRAL FILTER and PTDM performance was carried out for two measurement scenarios. The first scenario was for the case where CSR=40 and SNR=20 dB. The results are shown in FIGS. 4A-4D, which show errors in power and velocity measurements when $\sigma_p$=4 m/s, N=64, and $T_u$=1 ms. The results are plotted as a function of the normalized velocity $v/v_a$. It is apparent that the PTDM provides nearly unbiased velocity estimates. Furthermore, the PTDM precipitation power estimate has a standard deviation of about 1 dB lower than ADVANCED SPECTRAL FILTER.

In the second scenario, the PTDM was tested for the case where CSR=60 dB and SNR=20 dB. The results are shown in FIGS. 5A-5D, which also plots the results as a function of the normalized velocity $v/v_a$. In this instance, the number of samples used was again N=64 and the PRT was again $T_u$=1 ms. It is evident that a standard deviation of the velocity estimate is less than 2 ms and the bias is less than 0.6 m/s. The power estimate is unbiased for velocities larger than 0.2 $v_a$ and the standard deviation is less than 3 dB. The results therefore confirm that PTDM provides good retrieval results even for the cases where CSR is as high as 60 dB.

Figure 6:
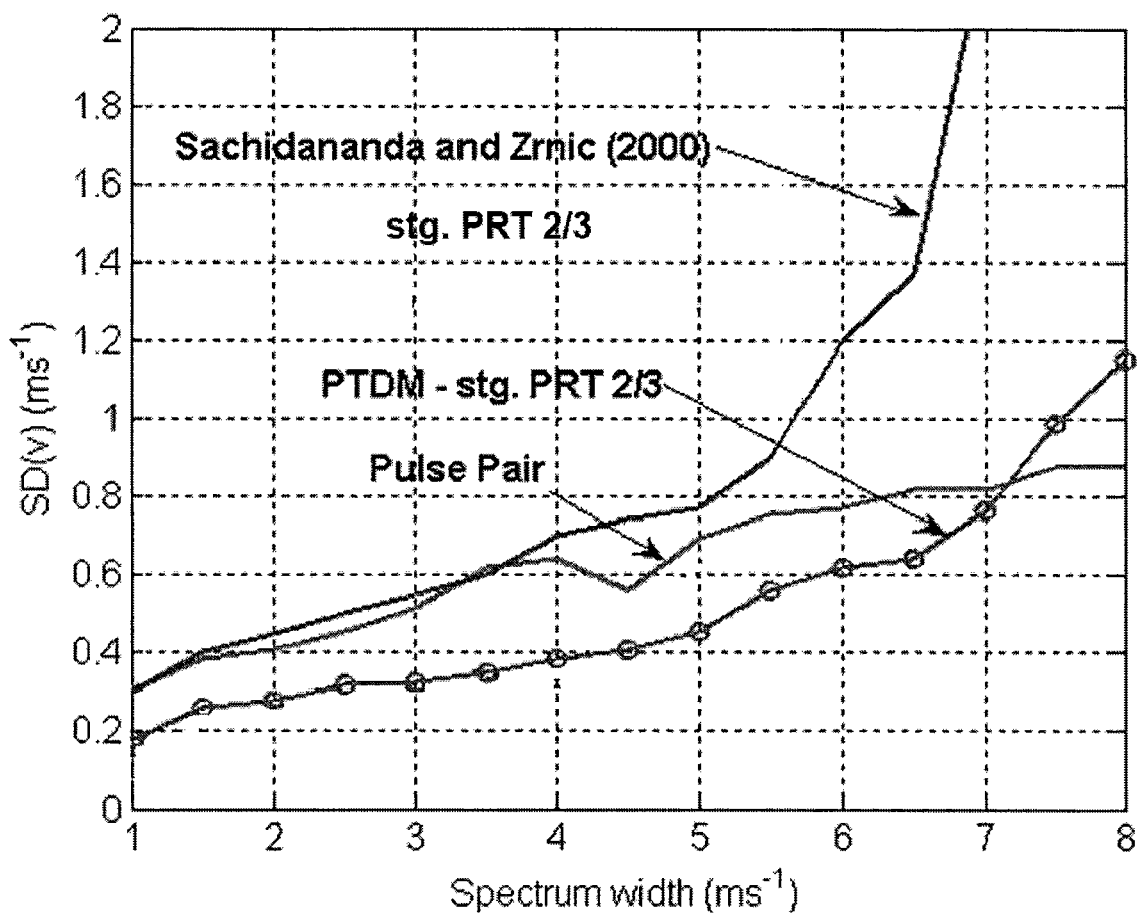
FIG. 6 illustrates an application of the PTDM to staggered pulse repetition time ("PRT") sequences.

Results for staggered PRT sequences may be consider both in the case where there is no clutter contamination and in cases where there is clutter contamination. When there is no clutter contamination, the velocity estimation accuracy has been considered by the inventors for different values of the spectrum width. In FIG. 6, the standard error of the PTDM retrieved velocity is compared to the pulse pair values. The pulse pair method was applied to the uniform sequence with a time sampling of $T_u$=0.5 ms and the PTDM was applied to two cases of staggered PRT sequences. In the first case, $T_1$ was equal to $2T_u$ and $T_2$ was equal to $3T_u$. In the second case, $T_1$=$3T_u$ and $T_2$=$4T_u$. In both cases, the sequence length was 64 samples, resulting in respective observation times of 80 and 112 ms. The length of the uniform sequence was 160 samples that correspond to the 80-ms observation time.

It is apparent from FIG. 6 that for both cases, the PTDM performs better than the pulse-pair technique for most values of spectrum width. The ¾ observation scheme has an increased standard deviation of the velocity for precipitation echoes spectra width exceeding 5.5 ms. The ⅔ observation scheme shows such an increase for spectra widths exceeding 8 m/s. For purposes of comparison, FIG. 6 includes results obtained using a particular spectral method, namely the one described in M. Sachidananda and D. S. Zrnic, "Clutter filtering and spectral moment estimation for Doppler weather radars using staggered pulse repetition time (PRT)," *J. Atmos. Oceanic Tech.* 17, 323 (2000) ("Sachidananda").

Figure 7A:
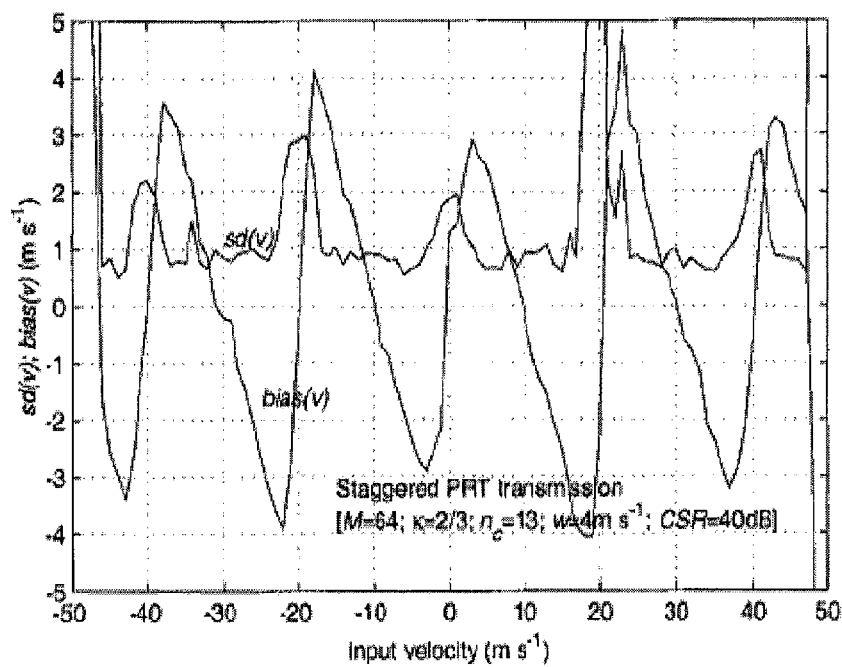
FIGS. 7A and 7B show errors in the velocity estimates from staggered PRT observations.
Figure 7B:
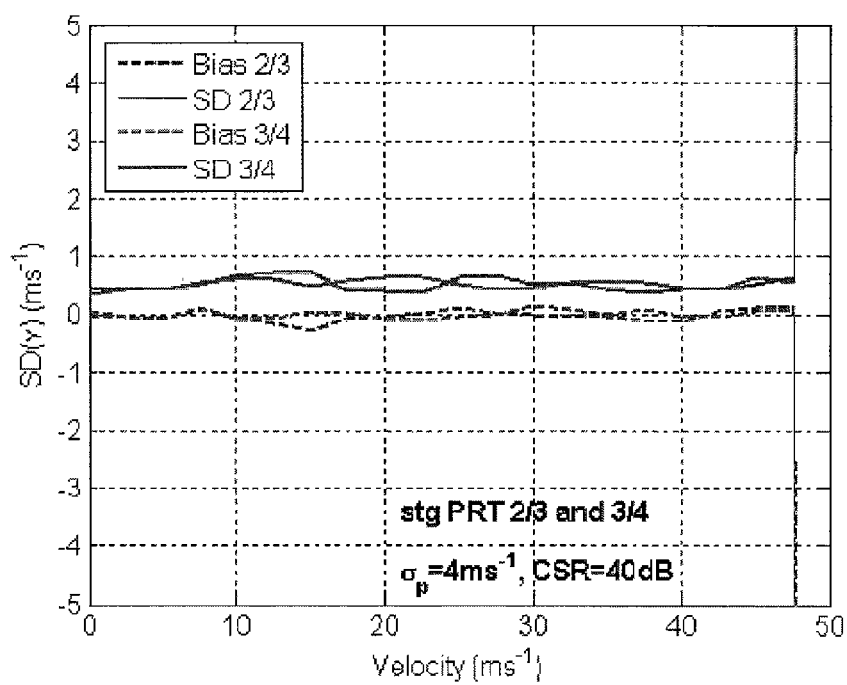
Figure 8:
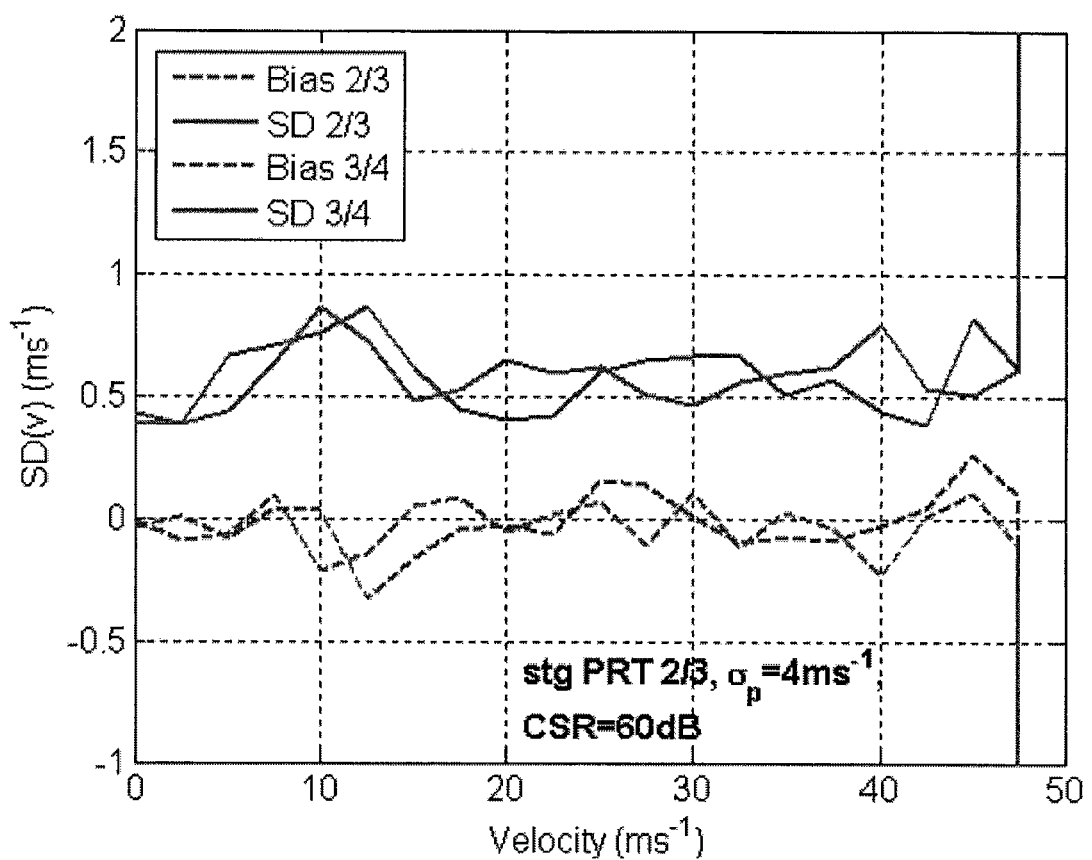
FIG. 8 shows the bias and standard deviation of velocity estimates obtained by PTDM from staggered PRT observations for two transmission schemes.

To evaluate the performance of the methods of the invention in cases where there is clutter contamination, two cases have been simulated, respectively having CSR values of 40 and 60 dB. Results for the PTDM velocity estimates with CSR values of 40 are provided with FIGS. 7A and 7B. FIG. 7A shows errors in the velocity estimates as taken from Sachidananda, while FIG. 7B shows the PTDM performance when SNR=20 dB, CSR=40 dB, $\sigma_p$=4 m/s, and N=64. The PTDM performance is quantified with bias and standard deviations of the velocity estimates. Results similar to those of FIG. 7B are provided in FIG. 8 in the form of bias and standard deviations of the velocity estimates for the case where CSR=40. Observations are provided in this case for the two transmission schemes of $T_1/T_2$=⅔ and ¾. Other relevant parameters used for generation of these results include SNR=20 dB, $\sigma_p$=4 m/s, and N=64. For both cases, the standard deviation of the velocity estimate does not exceed 1 m/s and the velocity bias is close to zero. There is also no increase in the estimation bias at the frequency bands where one would otherwise expect to see replicas of ground clutter. These results illustrate that the PTDM methods of the invention provide very accurate estimates of the velocity in scenarios involving clutter contamination even where the CSR is as high as 60 dB. These estimates are unbiased for all Doppler frequency bands.

The remaining results described below illustrate the performance of methods of the invention by applying those methods to time-series data of precipitation collected by a particular radar on a particular date. For these measurements, the radar antenna was at an elevation angle of zero degrees. In FIGS. 9A-9D, observed and estimated spectrographs are provided for a light precipitation measured by the radar. FIG. 9A shows the original spectrograph. FIG. 9B shows a spectrograph of the ADVANCED SPECTRAL FILTER-estimated precipitation. FIGS. 9C and 9D respectively show the estimated clutter and the precipitation spectrographs according to the PTDM methods of the invention. It is evident from these results that the ADVANCED SPECTRAL FILTER estimated spectra are slightly wider than the PTDM spectra. Such a characteristic may be attributed to the influence of window on the ADVANCED SPECTRAL FILTER retrieval. After a visual inspection of the computed spectra, one may conclude that they do not follow Gaussian-shaped curves.

Figure 10A:
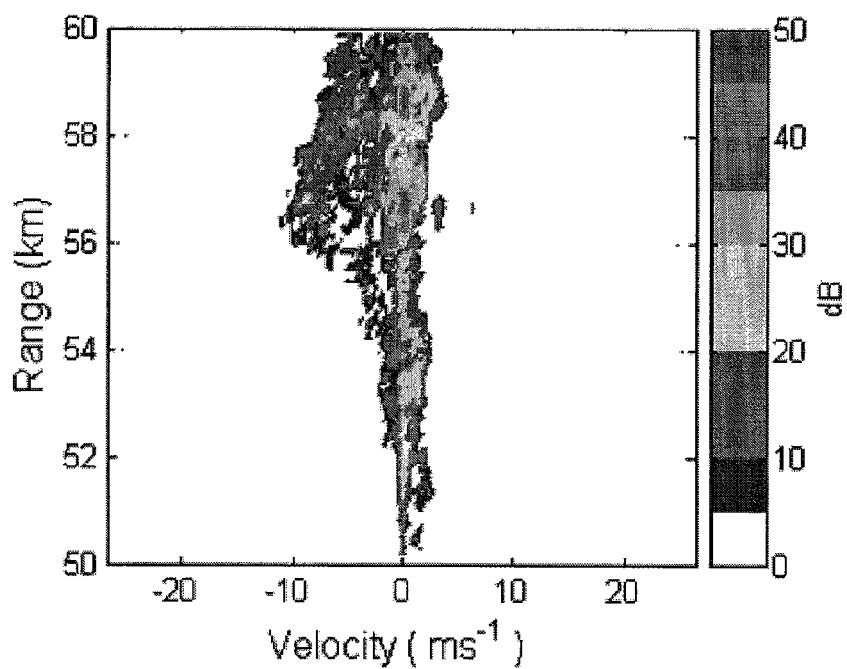
FIGS. 10A and 10B provide PTDM estimated spectrographs under conditions of two weather echoes.
Figure 10B:
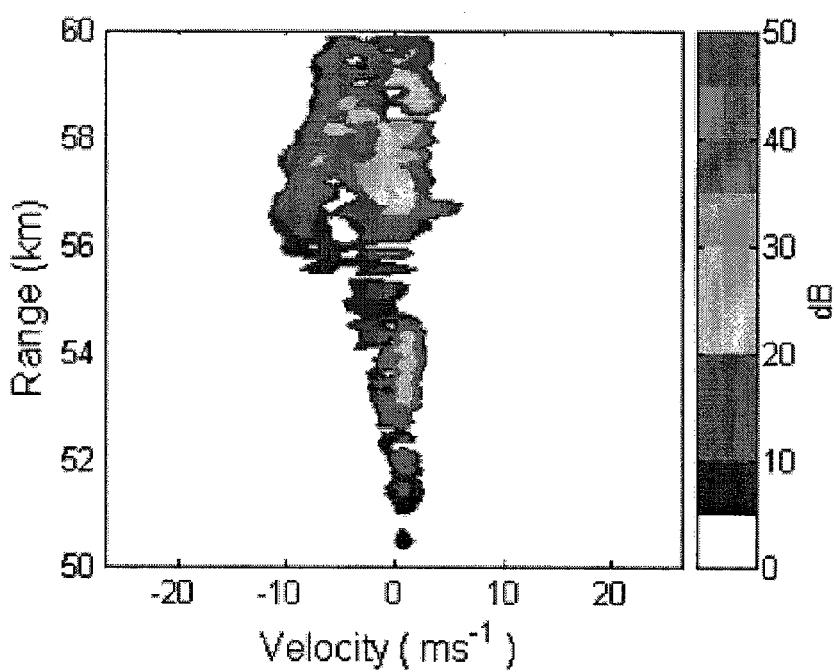

This is accommodated in embodiments of the invention where the method is adapted to allow for two precipitation echoes. In FIGS. 10A and 10B, the precipitation estimates resulting from application of such an embodiment are plotted. It is readily observable that for almost all range gates the estimation procedure has detected the presence of a second weather echo. It is also worth noting the close similarity of the spectrograph of FIG. 9A with that of FIG. 10A.

Figure 11A:
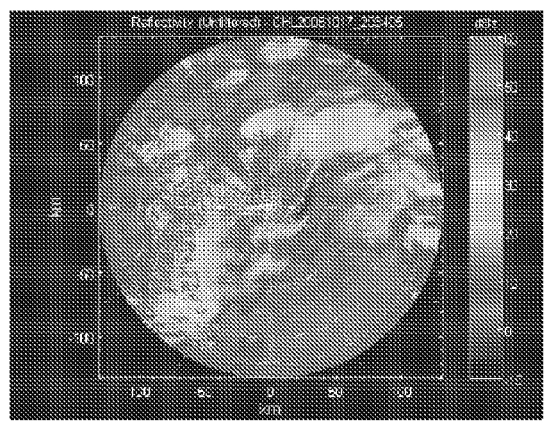
FIGS. 11A-11E provide an example of application of PTDM to snow-storm data collected by a particular radar.
Figure 11B:
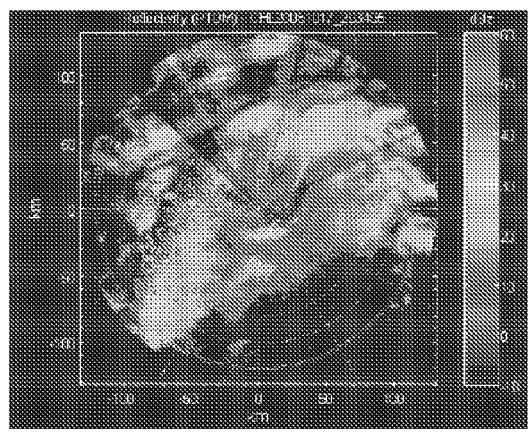
Figure 11C:
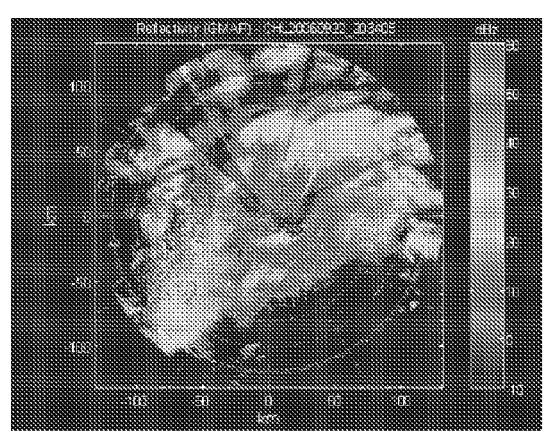
Figure 11D:
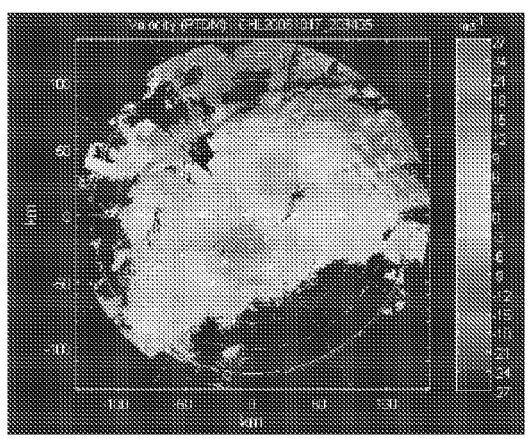
Figure 11E:
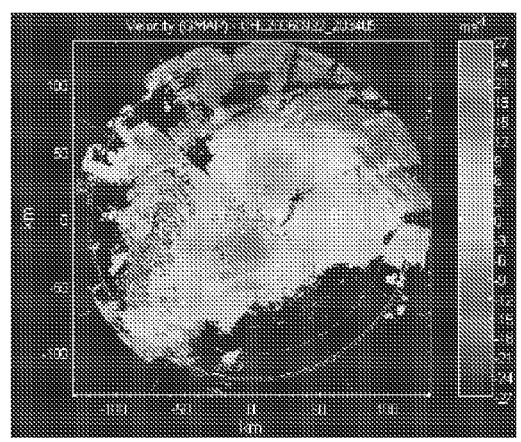
Figure 12A:
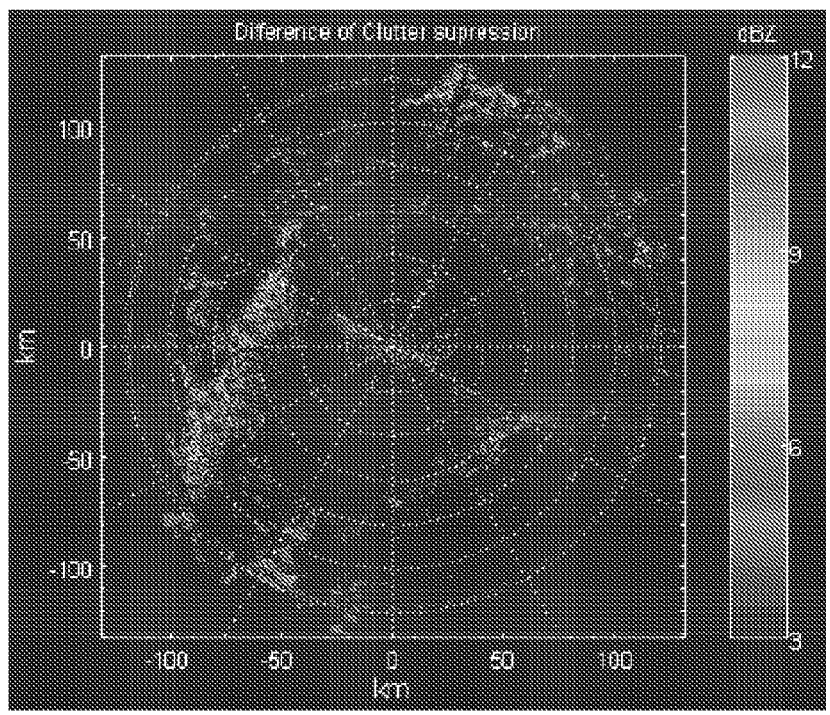
FIGS. 12A and 12B show reflectivity differences between PTDM and ADVANCED SPECTRAL FILTER estimates.
Figure 12B:
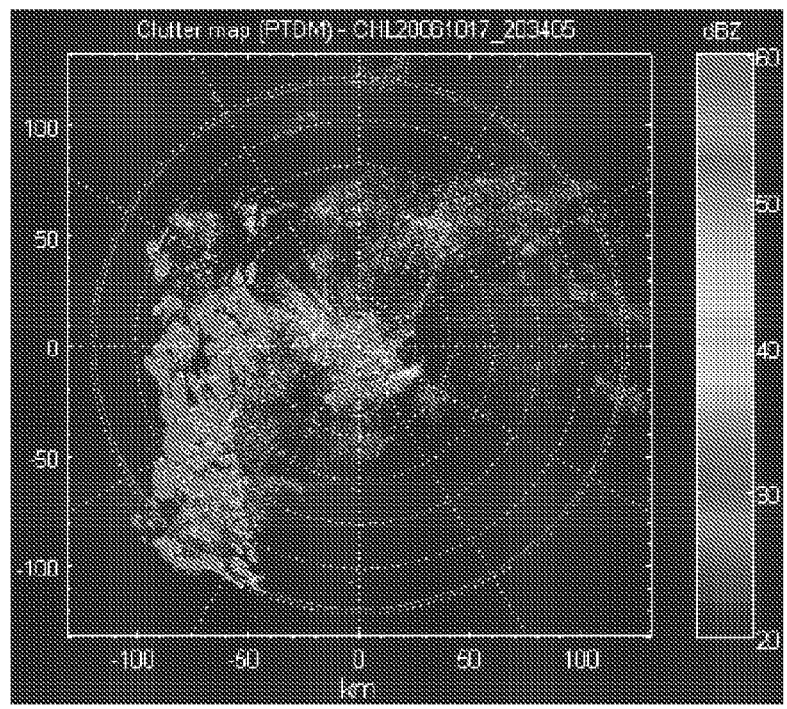

The PTDM and ADVANCED SPECTRAL FILTER methods were also applied to snowstorm data collected on a particular date. The PPI of this observation is shown in FIGS. 11A-11E. The elevation angle was 0.5° and the PRT was $T_u=1$ ms. The unfiltered reflectivity is shown in FIG. 11A; the reflectivity is shown in FIGS. 11B and 11C respectively for PTDM and ADVANCED SPECTRAL FILTER results; and the velocity is shown in FIGS. 11D and 11E respectively for PTDM and ADVANCED SPECTRAL FILTER results. It is apparent from the results that there is very strong clutter present at the azimuth angels around 270°. Differences in the estimated reflectivities are shown in FIGS. 12A and 12B, with FIG. 12A showing results for ADVANCED SPECTRAL FILTER and FIG. 12B showing results for PTDM. These results confirm that for this particular example, embodiments of the invention that use PTDM give around 10 dB more in clutter suppression than ADVANCED SPECTRAL FILTER.

The application of the methods of the invention to staggered PRT sequences is illustrated with FIGS. 13 and 14. To illustrate performance of the PTDM on radar measurements, staggered PRT observations were collected on a particular date with a particular radar. The measurements were carried out in a light rain event where reflectivities did not exceed 20 dBZ. In total, three PPI were collected: (1) a PPI with a ¾ staggered PRT sampling scheme for $T_1=1.5$ ms and $T_2=2$ ms; (2) a PPI with a uniform sampling scheme with $T=1$ ms; and (3) a PPI with a staggered PRT with $T_1=1$ ms and $T_2=1.5$ ms. The time difference between the measurements was about 5 minutes.

Figure 13A:
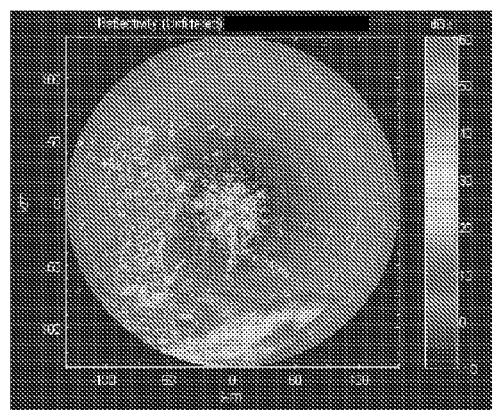
FIGS. 13A-13E provide an illustration of PTDM performance on observations from a particular radar.
Figure 13B:
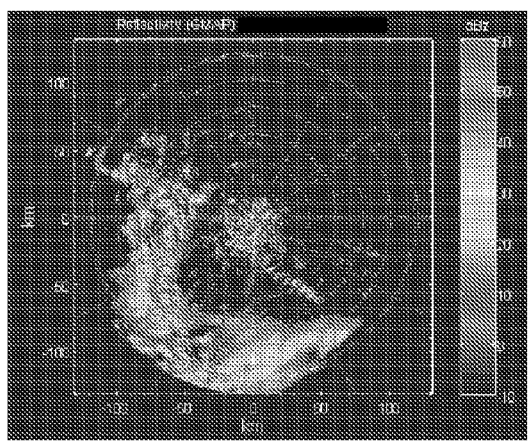
Figure 13C:
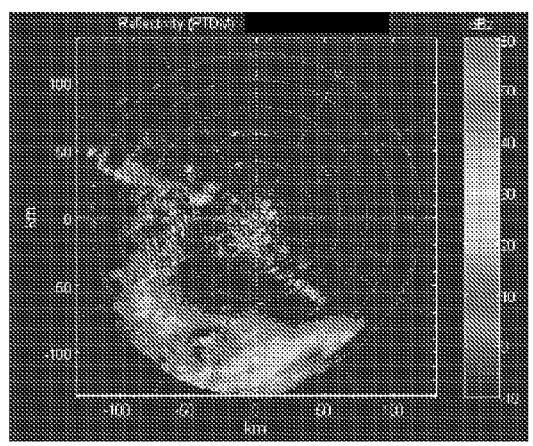
Figure 13D:
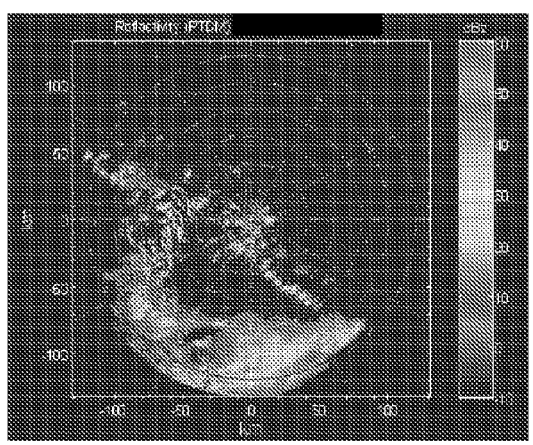
Figure 13E:
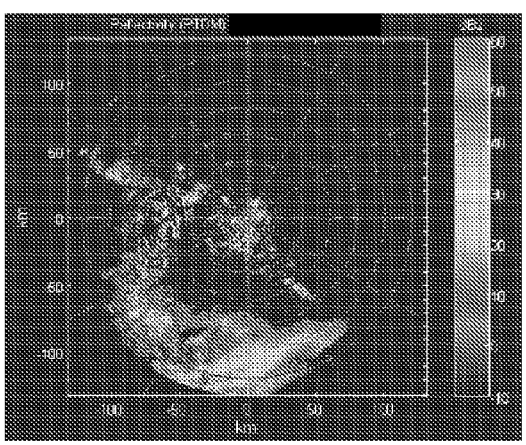
Figure 14A:
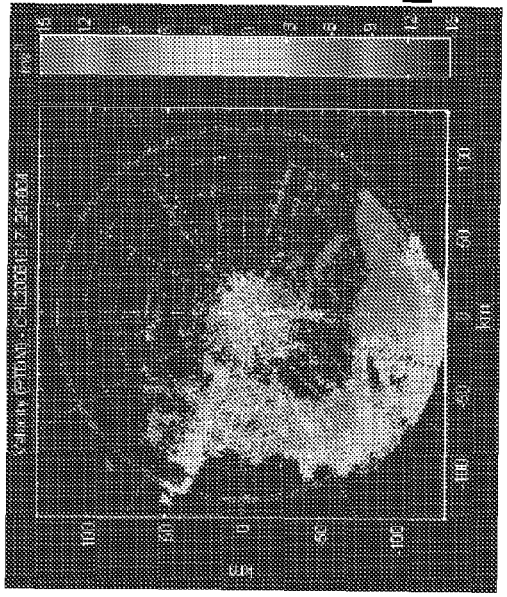
FIGS. 14A-14D show velocity estimations for data collected with a particular radar.
Figure 14B:
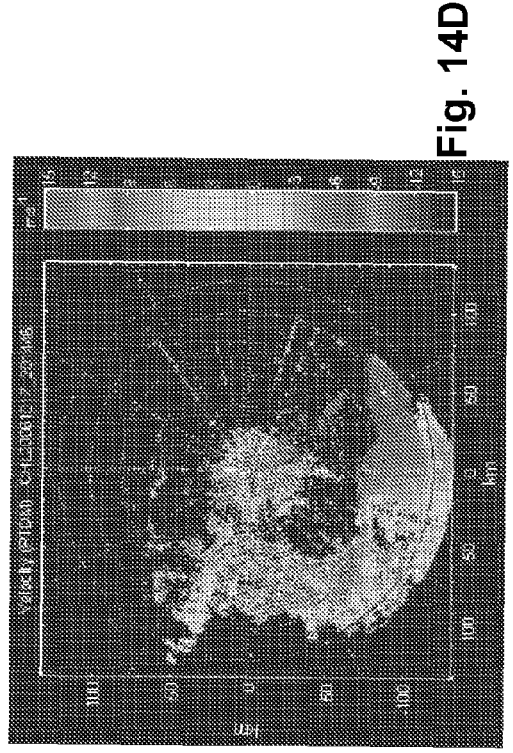
Figure 14C:
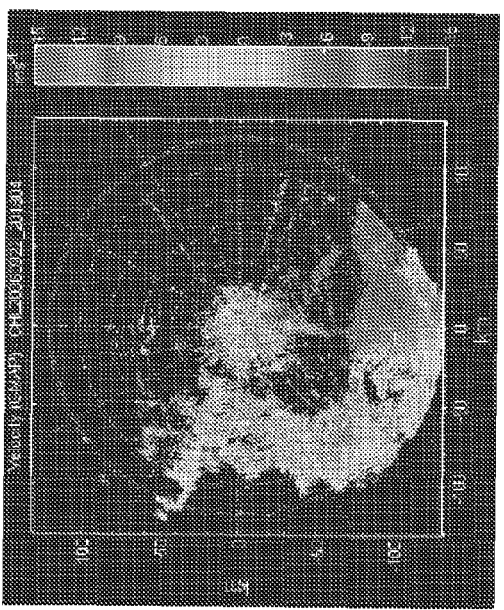
Figure 14D:
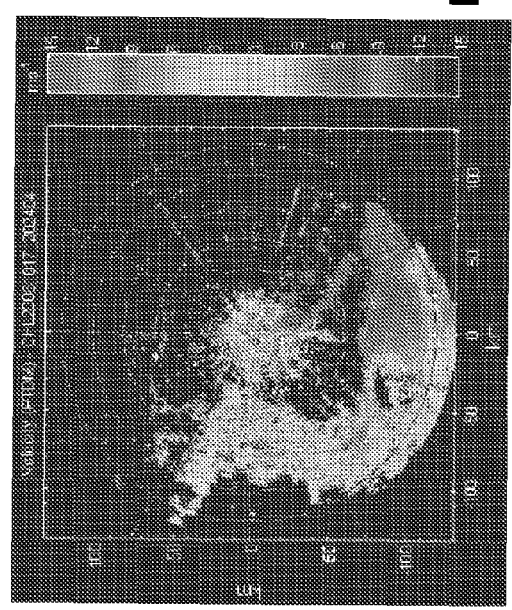

To compare, the PTDM performance on the staggered PRT sequences, the ADVANCED SPECTRAL FILTER clutter-suppression method was applied to the uniformly sampled observations. FIGS. 13A-13E show the resulting PPI, with FIG. 13A showing the original reflectivity and FIG. 13B showing the reflectivity for the single PRT determined with the ADVANCED SPECTRAL FILTER method. FIG. 13C shows the results of the single PRT with PTDM; FIG. 13D shows the reflectivity with the ⅔ staggered PRT sampling with PTDM; and FIG. 13E shows the reflectivity with the ¾ staggered PRT sampling with PTDM. FIGS. 14A-14D show corresponding velocity estimations. Specifically, FIG. 14A shows the velocity determined with the ADVANCED SPECTRAL FILTER method; FIG. 14B shows the velocity for the uniform PRT with PTDM; FIG. 14C shows the velocity for the ⅔ staggered PRT sampling with PTDM; and FIG. 14D shows the velocity for the ¾ staggered PRT sampling with PTDM. For at least this example, PTDM performs better than ADVANCED SPECTRAL FILTER in all cases. This is most clearly evident for ranges smaller than 20 km and for the measurements taken in the western direction, where clutter contamination from a known geological feature is present. In general, use of methods of the invention can obtain about 10 dB more clutter suppression than ADVANCED SPECTRAL FILTER and this performance is substantially independent of the transmitted waveform.

Embodiments of the invention using the parametric time-domain method can be applied to both uniform and staggered PRT sequences. The performance of the methods is good even in cases of strong clutter contamination, with CSR at least as high as 60 dB. Simulation of radar observations demonstrates that velocity estimates are substantially unbiased for all values of radial velocities. In addition, a measurement scheme using a staggered PRT sampling shows good results for spectra width values up to at least 6 m/s. Methods of the invention generally achieve better clutter suppression than the use of ADVANCED SPECTRAL FILTER.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of investigating a region of interest with a radar, the method comprising:
   propagating a radar signal to the region of interest;
   generating a waveform with a uniform pulsing scheme or nonuniform pulsing scheme;
   collecting sampled time-domain radar data scattered within the region of interest;
   calculating a sample covariance matrix with the sampled time-domain data; and
   calculating parameters of models that describe ground clutter, system noise, and weather signal, and that minimize a likelihood function calculated with the sample covariance matrix.

2. The method recited in claim 1 wherein the likelihood function is $L(\theta)=\ln(|R(\theta)|)+\text{tr}(R^{-1}(\theta)\hat{R}_v)$, where R is the covariance matrix having elements $$R[k,l] = P_p \exp\left[-\frac{8\pi^2 \sigma_p^2 (k-l)^2 T_s^2}{\lambda^2}\right] \exp\left[-j\frac{4\pi \bar{v}(k-l)T_s}{\lambda}\right] + \\ + P_c \exp\left[-\frac{8\pi^2 \sigma_c^2 (k-l)^2 T_s^2}{\lambda^2}\right] + \frac{2T_s}{\lambda}\sigma_N^2 \delta(k-l),$$

for $k, l = 1, \ldots, N$, wherein:
   $T_s$ is a measured signal sample;
   $\lambda$ is a wavelength of the radar signal;
   $j$ is $\sqrt{-1}$;
   $\delta$ is a Kronecker function; and
   the set of parameters comprises:
      $P_p$ as a precipitation signal power;
      $\sigma_p$ as a precipitation spectrum width;
      $\bar{v}$ as a mean velocity of precipitation;
      $P_p$ as a clutter power;
      $\sigma$ as a clutter spectrum width; and
      $\sigma_N^2$ as a noise power.

3. The method recited in claim 1 wherein collecting sampled time-domain radar data comprises collected time-domain radar data distributed nonuniformly in time.

4. The method recited in claim 3 wherein time spacings between subsequent collected time-domain radar data are substantially in a ratio of 2:3.

5. The method recited in claim 3 wherein time spacings between subsequent collected time-domain radar data are substantially in a ratio of 3:4.

6. A radar system for investigating a region of interest with a radar, the system comprising:
   a radar source configured to propagate a radar signal;
   a radar detector configured to collect radar data; and
   a computational system in communication with the radar source and with the radar detector, the computational system comprising a processor and a memory coupled with the processor, the memory comprising a computer-readable medium having a computer-readable program embodied therein for direction operation of the radar system to investigate the region of interest, the computer-readable program including:
      instructions for propagating the radar signal into the region of interest with the radar source;
      instructions for generating a waveform with a uniform pulsing scheme or a nonuniform pulsing scheme with the radar source;
      instructions for collecting sampled time-domain radar data scattered within the region of interest with the radar detector;
      instructions for calculating sample covariance matrix with the sampled time-domain data; and
      instructions for calculating parameters of models that describe ground clutter, system noise, and weather signal, and that minimize a likelihood function calculated with the sample covariance matrix.

7. The radar system recited in claim 6 wherein the likelihood function is $L(\theta)=\ln(|R(\theta)|)+tr(R^{-1}(\theta)\hat{R}_v)$, where R is the covariance matrix having elements $$R[k,l] = P_p \exp\left[-\frac{8\pi^2 \sigma_p^2 (k-l)^2 T_s^2}{\lambda^2}\right]\exp\left[-j\frac{4\pi \bar{v}(k-l)T_s}{\lambda}\right] + + P_c \exp\left[-\frac{8\pi^2 \sigma_c^2 (k-l)^2 T_s^2}{\lambda^2}\right] + \frac{2T_s}{\lambda}\sigma_N^2 \delta(k-l),$$

$$\text{for } k, l = 1, \ldots, N,$$

wherein:
   $T_s$ is a measured signal sample;
   $\lambda$ is a wavelength of the radar signal;
   j is $\sqrt{-1}$;
   σ is a Kronecker function; and
   the set of parameters comprises:
      $P_p$ as a precipitation signal power;
      $\sigma_p$ as a precipitation spectrum width;
      $\bar{v}$ as a mean velocity of precipitation;
      $P_{c\,b}$ as a clutter power;
      $\sigma_c$ as a clutter spectrum width; and
      $\sigma_n^2$ as a noise power.

8. The radar system recited in claim 6 wherein the instructions for collecting sampled time-domain radar data comprise instructions for collecting time-domain radar data distributed nonuniformly in time.

9. The radar system recited in claim 6 wherein time spacings between subsequent collected time-domain radar data are substantially in a ratio of 2:3.

10. The radar system recited in claim 6, wherein time spacings between subsequent collected time-domain radar data are substantially in a ratio of 3:4.

11. The method recited in claim 1 wherein calculating the sample covariance matrix comprises calculating a sample covariance matrix representative of the data collected within the region of interest by averaging covariance matrices calculated for each data subset.

12. The method recited in claim 1 further comprising calculating final parameters of ground clutter, noise, and weather-echo parametric time domain models by finding an extremum of the likelihood function.

13. The method recited in claim 1 further comprising computing a normalized trace of product between sample covariance matrix and estimated covariance matrix.

14. The radar system recited in claim 6 wherein the instructions for calculating the sample covariance matrix comprise instructions for calculating a sample covariance matrix representative of the data collected within the region of interest by averaging covariance matrices calculated for each data subset.

15. The radar system recited in claim 6 wherein the computer-readable program further includes calculating final parameters of ground clutter, noise, and weather-echo parametric time domain models by finding an extremum of the likelihood function.

16. The radar system recited in claim 6 wherein the computer-readable program further includes computing a normalized trace of product between sample covariance matrix and estimated covariance matrix.

* * * * *

UNITED STATES PATENT AND TRADEMARK OFFICE
CERTIFICATE OF CORRECTION

PATENT NO.       : 7,652,614 B2
APPLICATION NO.  : 11/830574
DATED            : January 26, 2010
INVENTOR(S)      : Chandrasekaran Venkatachalam et al.

It is certified that error appears in the above-identified patent and that said Letters Patent is hereby corrected as shown below:

Column 10, claim 2, line 56, delete "$P_p$" and insert --$P_c$--

Column 10, claim 2, line 57, delete "$\sigma$" and insert --$\sigma_c$--

Column 11, claim 7, line 42, delete "$\sigma$" and insert --$\delta$--

Column 12, claim 7, line 4, delete "$P_{c\ b}$" and insert --$P_c$--

Signed and Sealed this

Twenty-seventh Day of April, 2010

David J. Kappos
*Director of the United States Patent and Trademark Office*